United States Patent
Curran

(10) Patent No.: US 11,626,971 B2
(45) Date of Patent: Apr. 11, 2023

(54) METHOD AND SYSTEM FOR PROCESSING A GNSS SIGNAL USING HOMOMORPHIC ENCRYPTION

(71) Applicant: European Space Agency, Paris (FR)

(72) Inventor: James T. Curran, Cork (IE)

(73) Assignee: EUROPEAN SPACE AGENCY, Paris (FR)

( * ) Notice: Subject to any disclaimer, the term of this patent is extended or adjusted under 35 U.S.C. 154(b) by 100 days.

(21) Appl. No.: 16/721,312

(22) Filed: Dec. 19, 2019

(65) Prior Publication Data

US 2020/0204340 A1 Jun. 25, 2020

(30) Foreign Application Priority Data

Dec. 21, 2018 (EP) .................................... 18215723

(51) Int. Cl.
| | |
|---|---|
| *H04L 9/00* | (2022.01) |
| *G01S 19/37* | (2010.01) |
| *H04L 9/08* | (2006.01) |
| *H04L 9/40* | (2022.01) |

(52) U.S. Cl.
CPC .............. *H04L 9/008* (2013.01); *G01S 19/37* (2013.01); *H04L 9/0825* (2013.01); *H04L 9/0852* (2013.01); *H04L 63/0442* (2013.01); *H04L 2209/08* (2013.01); *H04L 2209/16* (2013.01)

(58) Field of Classification Search
None
See application file for complete search history.

(56) References Cited

U.S. PATENT DOCUMENTS

| | | | | |
|---|---|---|---|---|
| 6,178,207 | B1 * | 1/2001 | Richards | ................... G01S 5/14 |
| | | | | 342/450 |
| 7,589,671 | B2 * | 9/2009 | Loomis | ................. G01S 5/0009 |
| | | | | 342/386 |
| 9,436,835 | B1 * | 9/2016 | Saldamli | ............... G06F 21/602 |
| 9,684,080 | B2 * | 6/2017 | Liu | ......................... G01S 19/09 |

(Continued)

FOREIGN PATENT DOCUMENTS

| | | |
|---|---|---|
| EP | 2799907 A1 | 11/2014 |
| EP | 3104195 A1 | 12/2016 |

(Continued)

OTHER PUBLICATIONS

Karimi et al.; Accelerating a Cloud-Based Software GNSS Receiver; 2013; retrieved from the Internet https://arxiv.org/ftp/arxiv/papers/1309/1309.0052.pdf; pp. 1-17, as printed. (Year: 2013).*

(Continued)

*Primary Examiner* — Michael W Chao
(74) *Attorney, Agent, or Firm* — Dinsmore & Shohl LLP

(57) ABSTRACT

An apparatus and method are described for processing a global navigation satellite system (GNSS) signal, the GNSS comprising multiple satellites, wherein each satellite transmits a respective navigation signal containing a spreading code. The method comprises receiving an incoming signal at a receiver, wherein the incoming signal may contain navigation signals from one or more satellites; encrypting the incoming signal at the receiver using a homomorphic encryption scheme to form an encrypted signal; and transmitting the encrypted signal from the receiver to a remote server.

10 Claims, 3 Drawing Sheets

(56) References Cited

U.S. PATENT DOCUMENTS

| | | | | |
|---|---|---|---|---|
| 9,825,758 | B2* | 11/2017 | Feng | H04L 9/008 |
| 11,047,991 | B2* | 6/2021 | Raghupathy | G01S 19/11 |
| 11,115,078 | B2* | 9/2021 | Raghupathy | H04B 7/2618 |
| 11,120,163 | B2* | 9/2021 | Tawakol | G06Q 30/0251 |
| 11,211,971 | B2* | 12/2021 | Fenton | H04B 1/709 |
| 11,374,736 | B2* | 6/2022 | Gao | H04L 9/3093 |
| 11,415,701 | B2* | 8/2022 | Kurby | G01S 19/215 |
| 11,431,393 | B2* | 8/2022 | Faxér | H04B 7/0478 |
| 11,431,687 | B2* | 8/2022 | Soon-Shiong | H04L 63/0442 |
| 11,463,071 | B2* | 10/2022 | Lennen | G01S 19/21 |
| 2002/0015439 | A1* | 2/2002 | Kohli | G01S 19/50 375/148 |
| 2003/0235217 | A1* | 12/2003 | Verreault | H04N 21/23406 370/519 |
| 2004/0141549 | A1* | 7/2004 | Abraham | H04B 1/707 375/150 |
| 2004/0189515 | A1* | 9/2004 | Vannucci | G01S 19/05 342/357.29 |
| 2005/0174284 | A1* | 8/2005 | Abraham | G01S 19/29 342/357.23 |
| 2009/0046766 | A1* | 2/2009 | Avellone | G01S 19/30 375/142 |
| 2010/0329448 | A1* | 12/2010 | Rane | H04L 9/008 380/28 |
| 2011/0060918 | A1 | 3/2011 | Troncoso Pastoriza et al. | |
| 2013/0176168 | A1* | 7/2013 | Lo | G01S 19/426 342/357.3 |
| 2014/0104102 | A1* | 4/2014 | Enge | G01S 19/03 342/357.42 |
| 2014/0108800 | A1* | 4/2014 | Lawrence | H04L 9/3297 713/168 |
| 2014/0221005 | A1* | 8/2014 | Marshall | G01S 5/0273 455/456.1 |
| 2014/0232594 | A1* | 8/2014 | Oehler | G01S 19/11 342/357.51 |
| 2017/0078134 | A1* | 3/2017 | Nossek | H04B 1/06 |
| 2017/0134157 | A1* | 5/2017 | Laine | G09C 1/00 |
| 2017/0243028 | A1* | 8/2017 | LaFever | G06F 21/6263 |
| 2018/0188384 | A1* | 7/2018 | Ramanandan | G01S 19/53 |
| 2018/0356530 | A1* | 12/2018 | Liu | G01S 19/28 |
| 2018/0359078 | A1* | 12/2018 | Jain | G06F 21/602 |
| 2020/0132860 | A1* | 4/2020 | Dmitrievich | G01S 19/07 |
| 2021/0314201 | A1* | 10/2021 | Nikitin | H04L 25/08 |
| 2022/0026519 | A1* | 1/2022 | Wu | H04W 4/029 |
| 2022/0052734 | A1* | 2/2022 | Faxer | H04B 7/0645 |

FOREIGN PATENT DOCUMENTS

| | | |
|---|---|---|
| WO | 2006063613 A1 | 6/2006 |
| WO | 2007101454 A1 | 9/2007 |

OTHER PUBLICATIONS

Hong et al.; "Homomorphic Encryption Scheme Based on Elliptic Curve Cryptography for Privacy Protection of Cloud Computing"; 2016; Retrieved from the Internet https://ieeexplore.ieee.org/abstract/document/7502281; pp. 1-6, as printed. (Year: 2016).*

Chen et al; "A New ElGamal-based Algebraic Homomorphism and Its Applications"; 2008; Retrieved from the Internet https://ieeexplore.ieee.org/abstract/document/4609592; pp. 1-6, as printe. (Year: 2008).*

Krumm; "Inference Attacks on Location Tracks"; 2007; Retrieved from the Internet https://www.microsoft.com/en-us/research/wp-content/uploads/2016/12/inference-attack-refined02-distribute.pdf; pp. 1-18, as printed. (Year: 2007).*

"Homomorphic Encryption"; https://en.wikipedia.org/w/index.php?title=Homomorphic_encryption&oldid=813066539; Wikipedia; Retrieved Mar. 25, 2019.

Extended European Search Report pertaining to EP Application No. 18215723.0.

https://en.wikipedia.org/wiki/Homomorphic_encryption#ElGamal; retrieved on Dec. 16, 2019; 9 pages.

Chen Liang et al: "Robustness, Security and Privacy in Location-Based Services for Future IoT: A Survey", Jul. 2, 2017 IEEE Access, vol. 5 , pp. 8956-8977, XP011653528, DOI: 10.1109/ACCESS.2017.2695525 [retrieved on Jun. 19, 2017].

Jeyaprabha T J et al: "Smart and secure data storage using Encrypt-interleaving", 2017 Innovations in Power and Advanced Computing Technologies (I-PACT), IEEE, Apr. 21, 2017 (Apr. 21, 2017), pp. 1-6, XP033287825, DOI: 10.1109/IPACT.2017.8245140 [retrieved on Jan. 2, 2018].

European office action for application 18 215 723.0-1218 dated Feb. 14, 2022 (7 pages).

* cited by examiner

METHOD AND SYSTEM FOR PROCESSING A GNSS SIGNAL USING HOMOMORPHIC ENCRYPTION

CROSS-REFERENCE TO RELATED APPLICATIONS

The present application claims the benefit of European Patent Application No. 18215723.0, entitled "Method and System for Processing a GNSS Signal Using Homomorphic Encryption," filed Dec. 21, 2018, herein incorporated by reference in its entirety.

FIELD

The present specification relates to a global navigation satellite system (GNSS), and in particular to a method and system for processing a GNSS signal using homomorphic encryption.

BACKGROUND

Global navigation satellite systems (GNSS) are increasingly important in a wide range of applications, including in-car navigation support, location-based services for smartphones, and so on. GNSS may include a constellation of typically twenty to thirty satellites, each of which transmits a navigation signal incorporating a known spreading code (also referred to as a ranging code), which is a predetermined pseudo-random noise sequence of bits or chips, unique to that satellite. Analogous to a conventional CDMA (code division multiple access) system, a receiver cross-correlates the received signal with the spreading codes for the various satellites to acquire the navigation signals for respective satellites that are currently visible (above the horizon). The navigation signal for a satellite also encodes the position of the satellite and the time of transmission to a high accuracy.

To make a positional determination, the receiver locates the maximum of the cross-correlation function between the acquired navigation signal of a given satellite and a version of the spreading code for that satellite which is held or generated internally within the receiver. The maximum of the cross-correlation function corresponds to a code-phase alignment (zero offset) between the received spreading code and the internal spreading code (sometimes referred to as a range measurement) and is dependent on (i) the signal travel time from the satellite to the receiver, which is dependent on the spatial position of the satellite relative to the spatial position of the receiver and (ii) any timing (clock) bias (offset) of the receiver relative to the satellite (and hence relative to the GNSS system as a whole). By obtaining code-phase information for signals from multiple satellites, it is possible to solve for the clock bias and spatial position of the receiver. Note that in some applications, for example, certain cellular telephone infrastructure operations, use of the clock bias to provide timing alignment with the (highly accurate) timeframe of the satellite signals may represent the primary reason for accessing the GNSS signals (rather than performing position determination).

A typical approach for tracking the code-phase is to calculate the cross-correlation function for three different delays, referred to as Early, Prompt, and Late, whereby Prompt represents the expected delay (e.g., as determined from signal acquisition). The code-phase alignment can then be determined by fitting the expected correlation peak to the correlation values for these three different delays.

A given GNSS may support multiple navigation services, generally on different frequencies, whereby each service may use a different set of spreading codes for the respective satellites. For example, GNSSs are also used for military and other official purposes—indeed, the Global Positioning System (GPS) started as a military facility. However, the signals received from GNSS transmitters are generally weak, and have a known frequency; in addition, the spreading codes used on civilian (public) services are likewise generally known. This makes such signals vulnerable to jamming, spoofing, or other similar attacks by a third party adversary.

The signals used for military purposes are therefore protected, inter alia, by not divulging the spreading codes used on such services. However, this secrecy is only partly effective, because the satellite positions (as a function of time) are generally known, and the signals are broadcast over a wide area. Accordingly, an adversary could listen in to such signals and, with sufficient time and computing power, could eventually determine the secret spreading codes on a trial and error basis. To provide greater protection for the military service, the spreading codes used for each satellite are therefore subject to rapid change—typically a new (different) spreading code is used every few seconds. Such military GNSS signals are more robust against third party interference (jamming, etc), in that the third party will generally not know the spreading code currently being used within the lifetime of that spreading code—i.e. before the system switches to the next spreading code.

A receiver for use with the military service must be provided with knowledge of the sequence of spreading codes being used by each satellite, for example, successive spreading codes may be generated based on some secret algorithm. However, this means that each receiver then becomes a single point of failure for the system, since if one receiver is compromised, the sequence of spreading codes may become available to an adversary. Consequently, receivers for the military service must be handled with great security and care.

There is interest in extending the availability of the military service to other civilian organisations who might benefit from a highly reliable GNSS signal—e.g. one that is resistant to potential attacks by an adversary (such as a terrorist group). Examples of such organisations include the police, emergency rescue services (coastguard etc), fire and ambulance, etc. However, such organisations are often reluctant to accept the greatly increased security restrictions (and associated costs) that are associated with receivers for the military service. Accordingly, these organisations have generally preferred to continue using the public GNSS service with conventional receivers, and so have not been able to benefit from the enhanced reliability of the military GNSS services.

SUMMARY

The approach described herein allows range (position/location) measurements to be computed from observations of GNSS signals, obtained by a client receiver, that are modulated with secret (e.g. military) spread-spectrum sequences (spreading codes). Operating in a client-server architecture, homomorphic encryption is adopted to maintain two-way secrecy, ensuring that: (i) the position of the receiver is not disclosed to the server; and (ii) the secret ranging (spreading code) sequences are not disclosed to the client receiver.

Some implementations of the present approach provide a method of performing remote-processing of GNSS signals in which GNSS samples collected by a first party are processed by a second party, but without the position/location of the first party being revealed to the second party; in particular, the second party obtains neither the absolute position of the first party, nor the position of the first party relative to the second party. This method may be based on the use of somewhat-homomorphic encryption (SHE) for the GNSS signals received by the first party, and is extendable be utilized also with fully homomorphic encryption (FHE).

In some implementations, the second party performs remote-processing of secret/military/authorized GNSS signals comprising GNSS samples collected by the first party in such a way that the second party does not disclose any information about the secret/military/authorized GNSS signals to the first party. This method is based on the use of somewhat-homomorphic encryption (SHE) of the GNSS samples, and is extendable to fully homomorphic encryption (FHE). In addition, an intentional randomization may be applied to the results computed by the second party prior to delivery back to the first party to provide further protection for the secret/military/authorized GNSS signals.

In some implementations of the approach described herein, remote processing GNSS receivers operate by capturing samples of the GNSS signals, typically as digitized IF samples, at a user terminal (UT), and dispatching them to a remote processing server (RS). At the RS, these samples are processed to produce either (i) the UT position, or (ii) raw measurements with which the UT can determine its position. Remote processing can be performed on civilian GNSS signals or on authorized/military GNSS signals. Because the processing is performed on the RS, it is possible for the UT to enjoy some of the benefits of authorized/military GNSS services, but with only the RS having to be maintained or equipped with the special authorized/military receiver capabilities.

Furthermore, in the approach described herein, it is possible for the UT to use an RS without disclosing its position to the RS—e.g. the position of the UT is obfuscated, and hence not disclosed (directly or indirectly) the RS. The UT therefore maintains its location privacy, which provides clear benefits for commercial applications where the RS is a service provider—for example, in contexts such as fleet-management, asset-tracking, pay-per-use road-tolls and auto-insurance; timing systems for infrastructure (electricity); timing for financial applications; regulatory applications such as digital tachography, route-compliance; fisheries applications, etc Various implementations of the above approach are described. These implementations can be arranged to shift the majority of the processing burden between the remote server and the client receiver as desired.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

In a civilian GNSS system, the spreading (code) sequences are disclosed to all receivers, which implement a multiply and-accumulate based demodulation (correlation). In some cases, where it is desirable to restrict access to the positioning service (e.g. for military systems), secret spreading code sequences are employed, that are only disclosed to a small set of authorized receivers. This enables a strong form of access control on the signals and hence the associated positioning service, as well as a second benefit that the authorized receiver can place some trust in the computed position; because the spreading code sequences are secret, it is highly unlikely that the signals can be generated by devices other than the genuine GNSS satellite.

On the other hand, this also implies that the disclosure of the spreading code sequences for such a military system from authorized receivers would present a risk that the disclosed code sequences might then be used to launch masquerading or spoofing attacks. To avoid such an outcome, authorized receivers must contain some form of tamper-proof security perimeter. In many civilian applications, it is desirable to compute a position using such signals, such that the receiver has a relatively high assurance that the computed position is correct, however, the difficulties associated with acquiring and maintaining an authorized receiver, including the appropriate secured or tamper-proof signal-generation unit, are sometimes prohibitive.

As an alternative to the use of an authorized receiver, a receiver may not perform the calculation of the position locally, but instead dispatch the signal processing function to a remote server that is capable of acquiring or generating the secret (e.g. military) spreading code sequences. For example, the remote server might acquire the secret spreading code sequences by incorporating a suitably authorized (and protected) code generation (and/or storage) unit. It might also be possible for the remote server to use a high-gain or directional antenna to extract the secret spreading code sequence directly from the signal-in-space. In any event, the client receiver records a set of samples of the received GNSS signals and delivers them to the server, where they are processed to compute raw range measurements (in effect, values of correlations between the received signal and different spreading codes sequences). The server may compute the location of the client receiver from the raw range measurements, and this location is then returned to the client receiver, or the raw range measurements may be returned to the client receiver, which is then responsible for computing its location. However, in such an approach, the remote server also has access to the position of client receiver, which may be undesirable for various reasons, such as privacy and security of the operator of the client receiver.

Figure 1:
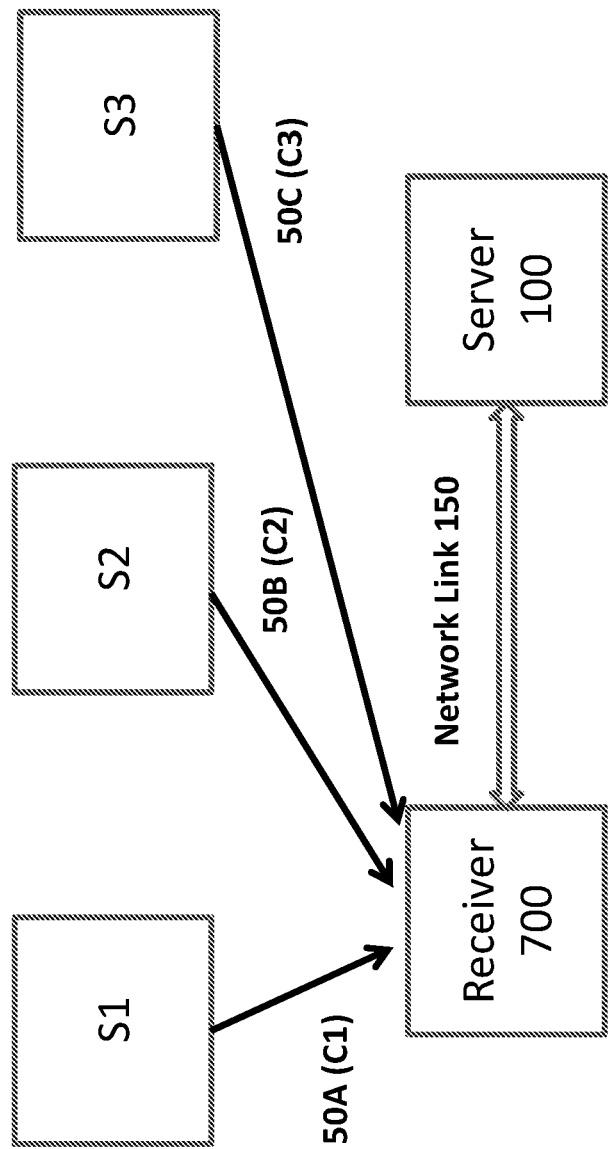
FIG. 1 is a high-level schematic view of various components in a GNSS system in accordance with one or more embodiments described herein.

FIG. 1 is a high-level schematic view of various components in a GNSS system in accordance with the approach described herein to help address the above issue. The GNSS includes multiple satellites S1, S2, S3, etc. It will be appreciated that although FIG. 1 shows only three satellites, the GNSS will normally comprise significantly more satellites, such as 20 or 30 satellites, of which a subset will be visible to a user at any given time. Each satellite broadcasts a navigation signal, namely signal 50A from satellite S1, signal 50B from satellite S2 and signal 50C from satellite S3 (and so on). Each signal incorporates(is encoded using) a spreading code that is specific to the transmitting satellite, i.e. code C1 is incorporated into signal 50A from satellite S1, code C2 is incorporated into signal 50B from satellite S2, code C3 is incorporated into signal 50C from satellite S3, and so on.

A user terminal 700 is provided for receiving the navigation signals 50A, 50B and 50C. The user terminal 700 may comprise a self-contained GNSS receiver, as described in more detail below, or may be incorporated into a larger device, such as a smartphone, camera, vehicle, and so on. In some cases, the user terminal 700 may also comprise multiple devices that cooperate to perform the functionality of the user terminal. These multiple devices will generally be closely associated with the user, for example, held or located on the person who is operating user terminal 700, or otherwise local to the user (in the sense of being connected by some form of local area network, wireless access point, near field communication, etc.).

Note that some navigation systems may include local elements (sometimes referred to as pseudolites). These are local positioning systems, for example at airports, which may supplement the positioning signals from a satellite navigation system to provide additional location information. It will be appreciated that user terminal 700 as described herein is intended to receive and process any suitable navigation signal (whether from a satellite, pseudolite, or any other relevant source).

FIG. 1 further shows a server 100 which can be considered as a remote data processing facility for use by the user terminal 700. The server 100 may be implemented in any suitable fashion, for example, using a single physical machine, or a cluster or cloud computing configuration. The user terminal 700 and the server 100 communicate with each other over a network link 150, which may be any suitable form of data connection, for example, over the Internet, a mobile telephone (cellular) network, a wired data connection, and/or any combination thereof.

Figure 2:
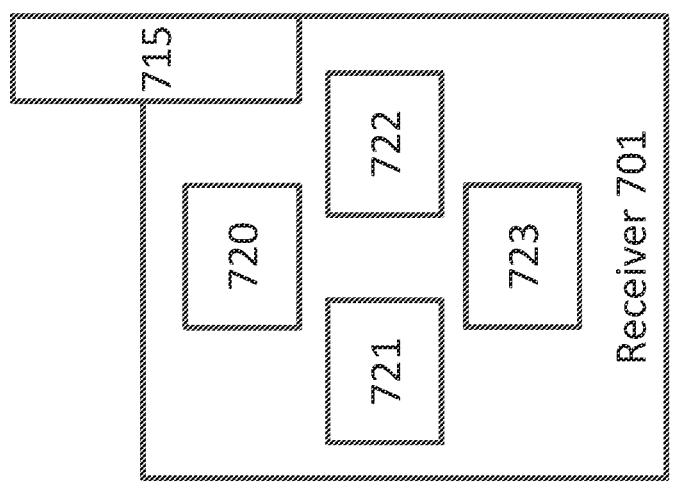
FIG. 2 is a high-level schematic block diagram of a receiver which may be used in a GNSS system in accordance with one or more embodiments described herein.

FIG. 2 is a high-level schematic block diagram of a receiver 701, which represents an example implementation of user terminal 700. The receiver 701 may be provided as a stand-alone unit, or may be incorporated into some larger device, for example a mobile (cellular) telephone, a cellular radio access node (e.g., a 5G small cell), a computer, an automobile or other form of vehicle, an aircraft or ship, a freight container, and so on. The receiver 701 includes at least one antenna 715 for receiving GNSS signals 50A, 50B, 50C. The antenna 715 links to an RF conditioning, down-conversion and A/D conversion unit 720, which in turn passes the base-band complex envelope of the signal received to channel acquisition and tracking unit. In a conventional receiver, a code generator is used to generate (or store) the spreading codes (pseudo-random noise sequences) for the satellite constellation. The channel acquisition and tracking unit is provided by the code generator with the relevant spreading codes so that the incoming channel(s) can be acquired by cross-correlation from the base-band complex envelope of the received signal.

In contrast, the receiver 701 is intended to operate with the military service, but without requiring the ability to generate or store the codes locally (within the receiver itself). Accordingly, the receiver 701 avoids the security restrictions placed on existing receivers for use with the military service, because access to the receiver 701 does not provide access to the spreading codes for the military service (unlike for conventional receivers intended for use with the military service). It will be appreciated that receiver 701 may also support use of the public (civilian) GNSS services; such support can be implemented in a conventional manner, e.g. using spreading codes stored or generated within the receiver 701.

In order to utilize the military service, receiver 701 in effect offloads certain processing to the server 100. To this end, the receiver includes an encryption unit 721, a decryption unit 722, and a communications unit 723. For certain applications, the decryption unit may be omitted, as described in more detail below. For certain implementations, the encryption unit (and optionally the decryption unit, if provided) may be provided in an associated (local) device, rather than in the receiver 701 per se, again as described in more detail below.

The approach described herein utilizes a cryptographic and signal processing algorithm that enables user terminal (UT) 700 to record GNSS signals and dispatch (send) them to the remote server (RS) 100 for processing. In particular, the approach involves certain cryptographic and signal processing operations that are applied to the recorded GNSS data by the UT 700 prior to sending the GNSS data to the RS 100; cryptographic and signal processing operations that are applied by the RS 100 to the GNSS data received from the UT 700; and cryptographic and signal processing operations that are applied by the UT 700 on the results returned by the RS 100. These operations may be embedded in a hardware and/or software in the UT 700, and likewise in hardware and/or software in the RS 100.

Importantly, this approach achieves off-loading of the processing without: (a) the RS 100 needing to know or becoming aware of the position of the UT 700; and (b) the UT 700 needing to know or becoming aware of the satellite spreading codes C1, C2, and so on. Regarding (a), this is important for respecting the privacy of the person associated with (e.g. operating) the user terminal. This maintenance of privacy may be particularly significant for commercial applications in which the RS is a service provider.

Regarding (b), this allows UT 700 to utilize the military service, with its associated benefits such as increase reliability. However, there is no need to subject UT 700 to onerous confidentiality and secrecy restrictions, because access to UT 700 does not provide or compromise access to the spreading codes of the military service (in the sense of knowing the actual bit sequences of the military spreading codes).

It is recognized that RS 100 will need to have knowledge of the military spreading codes to perform the processing offloaded from the UT 700, and hence RS 100 will therefore be subject to the confidentiality and secrecy restrictions that is associated with having such knowledge. However, subjecting the RS 100 to such restrictions is generally much more manageable than having to subject the UT 700 to these restrictions. For example, a single RS 100 may support multiple (e.g. hundreds, thousands, or more) UTs 700 (of which FIG. 1 shows just one example), so that the number of systems that are subject to the restrictions is greatly reduced. Furthermore, the RS 100 will typically be a fixed installation and is likely to already have physical security in terms of access restriction, etc., in contrast to UTs 700, which are portable and may often be taken into many different environments. In addition, the UTs are typically operated by organizations that may not specialize in security protection, however, the operator of the RS 100 may be a specific trusted entity (potentially the military itself). Accordingly, the approach described herein offers the benefits of using the military GNSS service to a large number of users (UTs 700) while maintaining a very high level of security associated with such use.

In order to describe the present approach in more detail, we denote the vector of GNSS samples collected at the UT 700 by $r=[r_0, r_1, r_2, r_3, \ldots r_N]$, where bold font denotes a vector, and normal font denotes a scalar. In a conventional GNSS receiver, the received samples are processed by correlating with a local replica of the GNSS signal (this can be considered as a form of matched filter). The local replica signal (which corresponds to a satellite spreading code, such as C1, C2, ... ) is denoted as $q=[q_0, q_1, q_2, q_3, \ldots, q_N]$, and we can then express a correlation value as the dot-product of these two vectors: $Y=r.q$, where the dot product is equal to the sum of the product of corresponding pairs of the vector elements, i.e.: $r.q=r_0q_0+r_1q_1+r_2q_2+ \ldots +r_Nq_N$.

In a remote processing architecture, the UT 700 collects r and dispatches r to the RS 100, which holds q, and so can compute Y, which is then returned to the UT 700. Given a value of Y for a selection of satellites, and for different timing offsets between r and q, the UT 700 can then determine its position. In some remote processing schemes, rather than return Y, the RS 100 might instead perform further processing to determine directly (i.e. by the RS 100 itself) the location of the UT 700.

The approach described herein also uses such remote processing, but avoids disclosing the position of the UT 700 to the RS 100; at the same time, the information about q is retained on the RS 100, without being disclosed to the UT 700. This separation of knowledge is achieved by using homomorphic cryptography. Homomorphic cryptography enables standard mathematical operations to be performed on encrypted data in such a way that the mathematical operation is consistent between unencrypted values and the encrypted values.

We adopt the following notation:

$eX=E\{X, Ke\}$ denotes the encryption of value X using the encryption key Ke $X=D\{eX, Kd\}$ denotes the decryption of value eX using the decryption key Kd Notice that the encryption and decryption functions use different keys, Ke and Kd, respectively. In a traditional public-key cryptosystem (such as ElGamal, see below), the encryption key, Ke, might be referred to as the public key. Using this notation, we can say that a cryptosystem is homomorphic if the following properties hold:

i) $E\{X \cdot Y, Ke\}=E\{X, Ke\}E\{Y, Ke\}$, or equivalently $X \cdot Y=D\{E\{X, Ke\} E\{Y, Ke\}, Kd\}$.

ii) $E\{X+Y, Ke\}=E\{X, Ke\}+E\{Y, Ke\}$, or equivalently $X+Y=D\{E\{X, Ke\}+E\{Y, Ke\}, Kd\}$.

A cryptosystem that satisfies i) or ii) (but not both) is said to be partially homomorphic, while a cryptosystem that satisfies both i) and ii) is said to be fully homomorphic. Cryptosystems that support both i) and ii) but which impose some limitations on the order/number of operations are said to be somewhat homomorphic. The approach described herein can be implemented using a partially, somewhat or fully homomorphic cryptosystem. An example of the partially homomorphic cryptosystem is ElGamal (see e.g. https://en.wikipedia.org/wiki/Hormomorphic encryption#ElGamal), which is used in various implementations of the approach described herein. This approach helps to protect the position or location of the UT 700 from the RS 100 by obfuscating the samples, r, prior to transmission to the RS 100, while still enabling, due to the homomorphic encryption, the RS 100 to perform a relevant correlation operation with respect to the local replica signal q.

Figure 3:
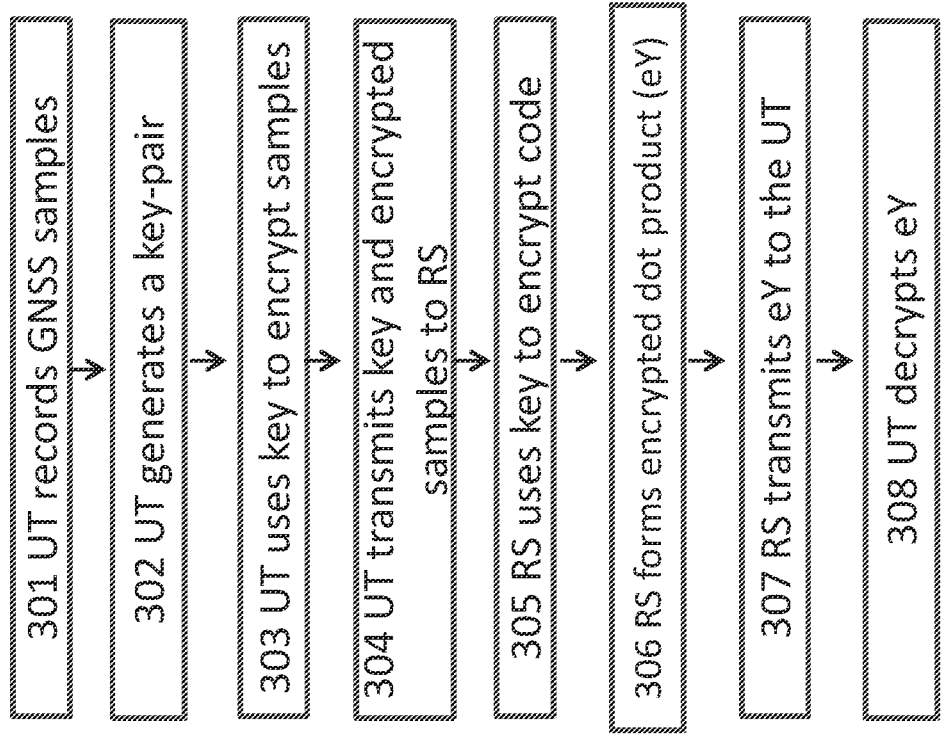
FIG. 3 is a high-level schematic flowchart showing various operations performed in accordance with one or more embodiments described herein.

FIG. 3 is a high-level schematic flowchart showing various operations performed in accordance with the approach described herein. In particular, the illustrated operations are as follows:

301) The UT records GNSS samples, r, as discussed above, for a suitable duration.

302) The UT generates a key-pair, Ke and Kd (this generation is performed before or after, or at the same time as, recording the samples in operation 301).

303) The UT uses Ke to encrypt the samples, r, to produce $er=E\{r, Ke\}$

304) The UT transmits both er and Ke to the RS (Ke corresponding to the public key generated at operation 302)

305) The RS uses Ke to encrypt q (the local replica) to produce $eq=E\{q, Ke\}$, using the value of Ke received from the UT 306) The RS forms the encrypted dot product $eY=er.eq$ 307) The RS transmits eY to the UT 308) The UT uses Kd to find the Y via $Y=D\{eY, Kd\}$ (where Kd corresponds to the private key generated at operation 302).

The cryptosystem is asymmetric, i.e encryption key $Ke \neq Kd$, such that Ke can be used to encrypt, but not to decrypt, hence the sample vector r is not accessible to the RS (from the version of r encrypted with encryption key Ke). Conversely, because the UT receives back from the RS just the encrypted value of eY, which is then decrypted using decryption key Kd, the local replica signal q is not available at the UT. Furthermore, because the encryption $E\{\ \}$ is homomorphic, the dot-product for position location can be performed on the encrypted pair of vectors er and eq to generate eY (see operation 306), which can then be decrypted to obtain Y (the correlation value for position determination) (see operation 308).

Figure 4:
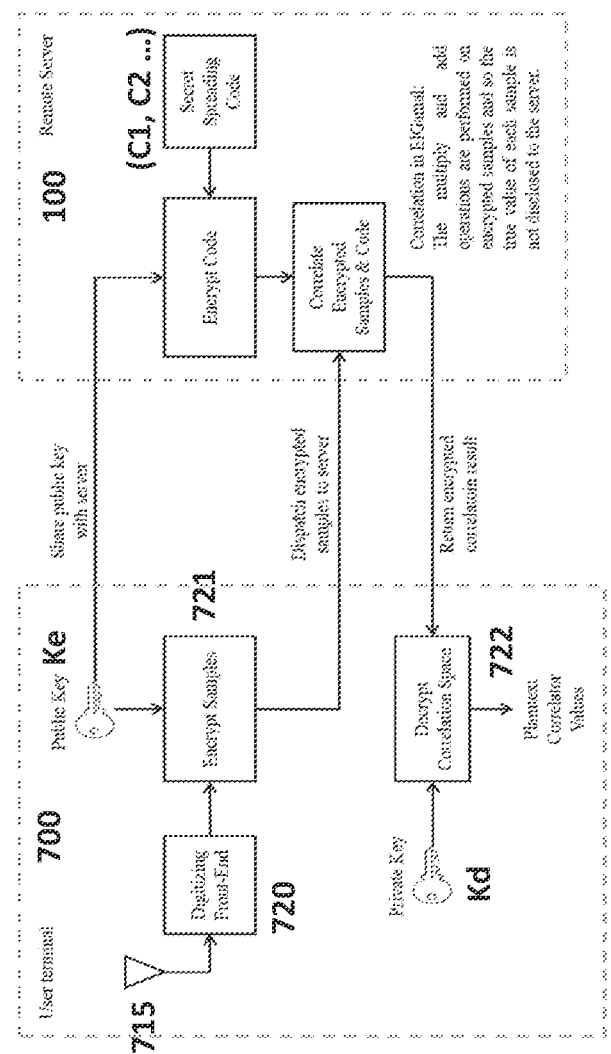
FIG. 4 is a high-level schematic block diagram showing various systems and operations performed in accordance with one or more embodiments described herein.

FIG. 4 is a high-level schematic block diagram showing an overall system and various operations thereof performed in accordance with the approach described herein to implement a privacy preserving remote processing scheme for GNSS position determination. As discussed above, the system includes a remote server 100 and a user terminal 700, such as receiver 701 shown in FIG. 2. The UT 700 includes an antenna 715, an RF conditioning, down-conversion and A/D conversion unit 720, a stored encryption key De and a stored decryption key Dk. The user terminal 700 further includes a communication facility or interface (implicit in FIG. 4) for performing data communications with the remote server 100.

In operation, the UT 700 receives an incoming signal which includes one or more of navigation signals 50A, 50B, etc. The incoming signal is digitized and encrypted using public key Ke using a homomorphic encryption system. The encrypted samples are then transmitted from the UT 700 to the remote server 100, and the public key Ke is likewise sent from the UT 700 to the remote server 100 (or otherwise made available to the remote server).

The RS 100 uses the public key Ke from the UT 700 to encrypt one or more spreading codes C1, C2 corresponding to satellites S1, S2, etc. The RS 100 then correlates the incoming encrypted samples with one or more encrypted codes. For example, the incoming encrypted samples are correlated with the encrypted code C1 to detect signal 50A from satellite S1, and are correlated with the encrypted code C2 to detect signal 50B from satellite S2. These correlations with different (encrypted) codes may be performed partly or fully in parallel. Since the multiply and add operations of the correlations are performed on the encrypted samples, the remote server is not able to determine the position of the UT 700 from the calculated correlation values.

The results of the encrypted correlations are then returned from the remote server 100 to the UT 700, and the UT 700 then decrypts the encrypted correlations results using the private key Kd corresponding to the public key Ke used to originally encrypt the samples and the codes C1, C2 and so on. Accordingly, Ke and Kd represent (are) an asymmetric public/private key pair. After the decryption has been performed, the resulting (plaintext) correlation values can be used to determine the position of the UT 700 in conventional fashion for a GNSS receiver.

In a basic functional experimental demonstration of the configuration shown in FIG. 4, the UT 700 has been implemented via software-defined radio on a personal laptop equipped with a GNSS-compatible digitizing front-end, and the RS 100 has been implemented on a second personal laptop computer, with communication between the UT 700 and RS 100 being performed over a wireless local area network. The encryption and decryption units 721, 722 on the UT 700, and the encryption facility on the RS 100 (to encrypt the codes), have been implemented in software making use of a selection of open-source cryptography libraries, including:

git://github.com/aistcrypt/Lifted-ElGamal.git
git://github.com/herumi/mie.git
git://github.com/herumi/cybozulib.git This experimental demonstration indicated that with appropriate selection of hardware and software for the remote server 100, the approach described herein is scalable to thousand or millions of users.

It will be appreciated that the configuration of FIG. 4 is provided by way of example, and other implementations are possible. For example, there may be a third component in the system (in addition to UT 700 and RS 100) which acts as a custodian of the secret spreading codes C1, C2 etc. In an initial setup phase, the UT 700 sends the public key (Ke) to the custodian, which then encrypts the secrete spreading codes C1, C2, etc with this public key, before supplying the encrypted secret spreading codes (and updates thereof) to the remote server 100. In this model, even the remote server 100 does not have access to the secret spreading keys, which may help to implement the remote server 100, for example, on a generic computing platform, such as in a cloud computing environment.

Alternatively (or additionally), rather than returning the encrypted correlation values to the UT 700, the RS 100 may send them to a further system, which may also be aware of the private key Kd in order to decrypt the encrypted correlation values. This configuration may be useful, for example, in the context of the operator of a fleet of vehicles tracking the vehicle locations, whereby the user terminals 700 are located in the vehicles, but the remote server 100 sends the encrypted correlation values to a separate computer associated the operator of the fleet for centralized tracking and management. (It would also be possible for the remote server 100 to send the encrypted correlation values to both the fleet operator, for centralized tracking, and also to some or all of the individual vehicles, for providing location information to the individual vehicles, e.g. to assist in arriving at a desired destination).

Accordingly, as described herein, the multiply-and-accumulate correlation computation used in the range (position) measurement process may be augmented using a homomorphic public key encryption scheme. In this way, the secret spreading code sequences are not disclosed by the remote server to the client receiver and, simultaneously, the position of the client receiver is not disclosed to the remote server.

Signal Processing for GNSS positioning

Modern GNSS signals typically use direct-sequence spread-spectrum (DSSS) code-division multiple-access (CDMA) modulations producing binary-phase-shift-keyed (BPSK) signals. The spreading-code is either chosen from a family of codes such that they have certain desirable cross- and auto-correlation properties, or it is generated using some form of cryptographically secure pseudo-random number-generator (CSPRNG) (which provides many more options for the code sequences, albeit with generally less ideal cross- and auto-correlation properties). The resulting complex baseband signal (r(t)) can be modelled by:

$$r(t) = \sum_{i \in SV} \sqrt{2C_{(i)}} \, c_{(i)}(t - \tau_{(i)}) \sin(\omega_{(i)} t + \theta_{(i)}) + n(t) \quad \text{(Equation 1)}$$

where C denotes the received power, c denotes the spreading code applied to the signal at transmission, r denotes the propagation latency or time-of-flight, ω denotes the carrier Doppler and θ denotes some initial phase. The subscript (i) denotes the satellite index, and n(t) denotes an additive Gaussian noise with one-sided power spectral density $N_0$ W/Hz. The broadcast of these signals is very precisely synchronized across the entire constellation of satellites, such that when a received signal is observed to contain a spreading sequence with a certain delay $c_{(i)}(t-\tau_{(i)})$, the receiver can deduce that it is located at a distance (range) given by $T_{(i)}$ multiplied by the speed of light in a vacuum. When three or more of these signals are observed by the receiver, and the satellite positions are known to it, the receiver can determine its position (at least four signals are needed if the clock bias of the receiver also needs to be determined).

In estimating $\tau_{(i)}$, GNSS receivers generally implement some form of matched filter per satellite where the receiver performs a correlation between the received signal and a conjugate replica of the spreading code for a given satellite:

$$Y_i = \frac{1}{T_I} \int_{t_0}^{t_0+T_I} r(t + \tau_{(i)}) c_{(i)}(t) e^{-j(\omega_{(i)}(t+\tau_{(i)}) + \theta_{(i)})} dt \quad \text{(Equation 2)}$$

where the low cross-correlation between the spreading codes for different satellites (different i) reduces multi-access interference, and the special autocorrelation properties of each of the codes (approximating the ideal autocorrelation of a single maximum at zero delay and zero for all other delays) enable the receiver to estimate the ranging parameter, $T_{(i)}$, for each satellite S1, S2 . . . whose signal 50A, 50B . . . is visible (present) in the received signal r(t). $T_I$ denotes the integration of the correlation. Choosing $c_{(i)}(t)$ as a member of a family of finite-length codes supports rapid detection and accurate tracking of the received GNSS signal. On the other hand, generating $c_{(i)}(t)$ using a CSPRNG can obfuscate the GNSS signals, rendering these signals difficult to use by non-authorized receivers, but relatively simple to track by receivers equipped with an appropriately initialized (keyed) CSPRNG.

In a digital receiver, the process defined by Equation (2) above is usually implemented in discrete-time, sampled at a constant rate of $F_s=1/T_s$, leading to a sampled (discrete time) version of Equation 2 as shown below:

$$Y_i = \frac{1}{L}\sum_{k=0}^{L} r(kT_s + \tau_{(i)})c_{(i)}(kT_s)e^{-j(\omega_{(i)}(kT_s+\tau_{(i)})+\theta_{(i)})} \quad \text{(Equation 3)}$$

where L represents the number of discrete-time samples used to correlate with the local replica of the spreading code (such that $LT_s$ in effect represents the integration time $T_I$), and, without loss of generality, it is assumed that $t_0=0$. Given this expression, it is clear that Y(i) is distributed according to:

$$Y_i = \begin{cases} N\left(\sqrt{C}, \frac{N_0}{2T_I}\right) & \text{signal present} \\ N\left(0, \frac{N_0}{2T_I}\right) & \text{otherwise} \end{cases} \quad \text{(Equation 4)}$$

By separating the local replica spreading code, and the product of the received signal and replica carrier, then Equation (3) can be expressed as a scalar product of two vectors represented as:

$$c_{(i),k} = c_i(kT_s) \quad \text{(Equation 5)}$$
$$r_{(i),k} = \Re\left\{r\left(kT_s + \left\lfloor\frac{\tau_i}{T_s}\right\rfloor T_s\right)e^{-j(\omega_{(i)}(kT_s+\tau_{(i)})+\theta_{(i)})}\right\}$$

where $\Re(x)$ denotes the real-valued part of x. Further denoting $r_{(i)}=[r_{(i),0}, r_{(i),1}, \ldots r_{(i),k}, \ldots r_{(i),L}]$ and $c_{(i)}=[c_{(i),0}, c_{(i),1}, \ldots c_{(i),k}, \ldots c_{(i),L}]$, then Equation (3) can be written as:

$$Y_{(i)} = \frac{r_{(i)} \cdot c_{(i)}}{L} \quad \text{(Equation 6)}$$

Notice that in this formulation, the received signal is sampled at a rate of $1/T_s$ and is shifted by integer samples $$\left(\left\lfloor\frac{\tau_{(i)}}{T_s}\right\rfloor T_s\right)$$

to bring it into alignment with the sampled local replica signal, $c(kT_s)$.

The ranging waveform (spreading code), $c_{(i)}(t)$, is assumed to be generated based on a pseudo-random bipodal sequence, denoted here by $q_{(i)} \in (1; -1)$. Typically, $q_{(i)}$ is carefully generated so as to satisfy certain properties of randomness, which can be loosely captured in the requirement that knowledge of a subset of $q_{(i)}$ should not enable or support the prediction of any element, not in this subset, with probability measurably better than 0:5 (with 0.5 being the probability of predicting an element of a bipodal sequence on a purely random basis.

Figure 5:
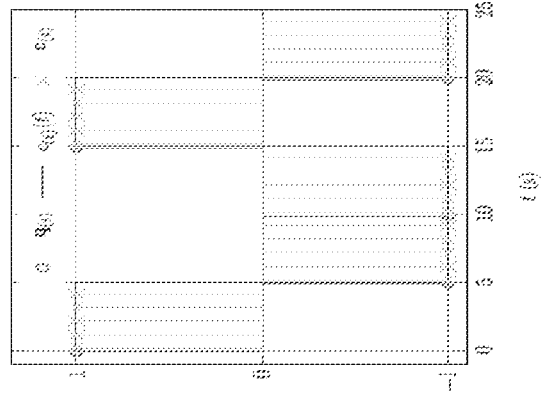
FIG. 5, shows a spreading sequence (code), $q_{(i)}$, the continuous spreading waveform $c_{(i)}(t)$ derived from this code, and the sequence of samples of this waveform, $c_{(i)}$, for correlation with an incoming (received) signal in accordance with one or more embodiments described herein.

The bipodal sequence $q_{(i)}$ is transformed into a continuous rectangular non-return-to-zero waveform, $c_{(i)}(t)$, according to:

$$c_{(i)}(t) = \sum_{l=-\inf}^{\inf} rect\left(\frac{t}{T_c} - l\right)q_{(i),l} \quad \text{(Equation 7)}$$

where rect(t) is a rectangular pulse equal to unity between $0 \le t < 1$, and zero elsewhere and $q_{(i),l}$ is the lth element of the sequence $q_{(i)}$. The waveform is sampled to produce the sequence $c_{(i)}$ given by: $c_{(i);k}=c_i(kT_s)$ as shown in FIG. 5, which shows the spreading sequences (codes), $q_{(i)}$, the continuous spreading waveform $c_{(i)}(t)$, and the sequence of samples of this waveform, $c_{(i)}$, as used for the correlation with the incoming (received) signal, i.e. r(t)—or some derivative thereof. It is necessary to use $c_{(i)}(kT_s)$ to compute the correlation value $Y_{(i)}$), however $c_{(i)}$ or, equivalently, $q_{(i)}$, must be kept secret.

In what follows, we consider a set of samples, $r_{(i)}$, held only by a client, and a secret code, $q_{(i)}$, held only by the server. We describe a method using homomorphic encryption whereby the correlation value $Y_{(i)}=1/L(r_{(i)}.c_{(i)})$ can be computed without disclosing the vector $r_{(i)}$ to the server or the vector $c_{(i)}$ to the client.

Homomorphic Encryption

Homomorphic encryption is a type of data encryption that enables or supports some form of mathematical computation on encrypted data. Typically, a homomorphic encryption system will support one or more mathematical operators. In such a system, the operator is applied to the encrypted form of a set of arguments and the desired result is attained by decryption. If we denote encryption by $\mathcal{E}[.]$ and decryption by $\mathcal{D}[.]$, and some operator *, then a homomorphic encryption system satisfies the following equation: (Equation 8)

$$\mathcal{D}[\mathcal{E}[x] * \mathcal{E}[y]] = x * y$$

Various different cryptosystems with varying degrees of homomorphism exist, differing in the number of operators (*) that are supported, and how these operators can be used. In particular, the following distinctions are generally recognised:

Partially Homomorphic Encryption (PHE): homomorphic with respect to one operator, either addition or multiplication, and an arbitrary number of operations can be performed.

Fully Homomorphic Encryption (FHE): homomorphic with respect to both addition and multiplication, and an arbitrary number of operations can be performed.

Somewhat Homomorphic Encryption (SHE): homomorphic with respect to both addition and multiplication, however there may be a constraint on how many operations can be performed. Examples of cryptosystems that are additively homomorphic include Goldwasser-Micali, Paillier, and Okamoto-Uchiyama; examples of cryptosystems that are multiplicatively homomorphic include RSA and ElGamal.

Although FHE systems are the most powerful, they are generally the most computationally complex; accordingly such systems are primarily suited to applications that have only a limited amount of encryption/decryption to perform, compared with a GNSS service, in which correlations are performed on an ongoing basis. Thus (for presently available implementations of homomorphic systems), SHE system is more practical for use in a GNSS environment for determining correlations, in which there is one (vector) multiplication of the received signal against the spreading code, and then an additive sum across all vector components (see Equation 3). One known SHE system is Boneh-Goh-Nissim (BGN), which is based on the application of 2-DNF formulas to the cyphertext (Disjunctive Normal Form with at most 2 literals in each clause). Notably, such a system supports multi-level arguments, for example as produced by a multi-bit quantizer, a multi-level reference code or a multi-level local carrier replica.

However, a further simplification is possible due to the spread-spectrum nature of GNSS signals, since only a very small degradation in signal quality is incurred even when the received signals are coarsly quantized. Thus even if the received signal is quantized to just a single bit, the total loss in signal-to-noise ratio is below 2 dB. If we make such an approximation (quantisation) of the incoming signal, the correlation operation of Equation (3) can be reduced to a simpler binary scalar-product operation, for which the ElGamal cryptosystem (another form of SHE system) is sufficient. The ElGamal cryptosystem and its use in performing GNSS correlations will now be described.

A set of elements and an operator are said to form a group, $\mathcal{G}$ when they satisfy the four group axioms: operations are closed on $\mathcal{G}$ associativity holds; there is an identity element; and an inverse element exists for each element. Such a group is cyclic group if it can be generated from repeated application of the operator to a single element, g, which also implies commutativity. The number of elements in the group is termed the order and denoted $|\mathcal{G}|$.

The ElGamal crypto-system is defined over any cyclic group, however for simplicity we will consider first groups based on the natural numbers, in particular, the set of natural numbers on the interval $\{0, \varepsilon-1\}$, for some prime E, with the multiplication operation being performed modulo $\varepsilon$. This results in the finite cyclic group $\mathbb{Z}*_\varepsilon$ that has order $q=|\mathbb{Z}*_\varepsilon|$. The following procedure is then performed:

i) Key Generation: To generate a key pair, an integer, x, is chosen at random on the interval $\{1, q-1\}$ and then $h:=g^x$ is computed. The private and public keys of an asymmetric key pair are then given by: (Equation 9 and Equation 10)

$$K_{priv}:=X$$

$$K_{pub}:=(\mathcal{G},q,g,h)$$

ii) Encryption: To encrypt a message, $m \in \mathcal{G}$ using the public key $(\mathcal{G}; q, g, h)$, an integer y is chosen at random on the interval $\{1, q-1\}$ and the encryption of m is given by: (Equation 11)

$$(z_1;z_2) = \mathcal{E}[m;K_{pub}] = (g^y, mh^y)$$

iii) Decryption: Using the private key, x it is possible to decrypt $(z_1; z_2)$ and recover m. This is done by: (Equation 12)

$$m = \mathcal{D}[(z_1z_2),x] = z_2(z_1^x)^{-1}$$

where the notation $z^{-1}$ denotes the modular multiplicative inverse of z in $\mathcal{G}$ such that $z(z^{-1})=1$. The multiplicative invoice can be found, for example, using the extended Euclidean algorithm, or the Euler algorithm. The result in Equation (12) by substituting Equation (11) into Equation (12):

$$m = z_2(z_1^x)^{-1} \quad \text{(Equation 13 and Equation 14)}$$
$$= mh^y(g^{yx})^{-1}$$
$$= mg^{xy}(g^{yx})^{-1}$$
$$= m$$

The security of the scheme is provided by the fact that the message, m, is not directly revealed by revealing $(z_1; z_2)$. Thus to recover m from $z_1; z_2$, it is necessary (see Equation (11)) to first deduce y from $g^y$, and then multiply $z_2$ by $(h^y)^{-1}$. The difficulty of recovering y from $g^y$ is known as the discrete logarithm problem, and is the security basis of the cryptosystem. However, if the private key, x, is known, then the recovery of the message can be performed by modular inversion and multiplication, as per Equation (12).

The ElGamal encryption is multiplicative homomorphic, as can be illustrated by a simple example. Given two messages, $m_1, m_2 \in \mathcal{G}$, applying the encryption function of Equation (11) to each message, and computing the product, we obtain:

(Equation 15, Equation 16 and Equation 17)

$$\mathcal{E}[m_1] \cdot \mathcal{E}[m_2] = (g^{y_1}, m_1 h^{y_1}) * (g^{y_2}, m_2 h^{y_2})$$
$$= (g^{(y_1+y_2)}, m_1 m_2 h^{(y_1+y_2)})$$
$$= \mathcal{E}[m_1 m_2]$$

By a similar example, it can be shown that ElGamal encryption is not additively homomorphic.

As noted above, the correlations in the context of a GNSS service are based on addition and subtraction over the integers, which implies the evaluation of an expression of the form such as: (Equation 18)

$$m_1+m_2+m_3-m_4$$

In a homomorphic system, the computing device has access only to the encrypted versions of $m_1, m_2, m_3, m_4$, namely $\mathcal{E}[m_1], \mathcal{E}[m_2], \mathcal{E}[m_3], \mathcal{E}[m_4]$. As noted above, ElGamal is not in fact homomorphic for addition; however, we can achieve the addition of encrypted variables using ElGamal by expressing the problem instead in terms of multiplication, in particular by using exponentiation according to the following: (Equation 19)

$$\mathcal{E}[g^{m_1}] * \mathcal{E}[g^{m_2}] = \mathcal{E}[g^{m_1+m_2}]$$

That is, to achieve the addition of two variables, $m_1, m_2$, they are placed in the exponent, for example: (Equation 20)

$$g(m_1*m_2+m_3*m_4) = \mathcal{D}[g(\varepsilon[m_1]*\varepsilon[m_2])*g(\varepsilon[m_3]*\varepsilon[m_4])]$$

where the right-hand-side of Equation (20) operates only on encrypted variables. It will be noted that the desired result, on the left-hand-side of (20), represents the exponent of g, and so is not immediately accessible. To retrieve the value of the exponent, the discrete logarithm of the left hand side of Equation (20) must be found. However, as mentioned above, this task corresponds to the discrete logarithm problem, and is, by design, very difficult in the general case (in order to provide the security of the ElGamal encryption scheme. Nevertheless, if the value of the exponent is bounded, i.e. known to lie within a relatively small range, then the left-hand-side of Equation (20) can be solved either by a brute-force search.

For the particular case of computing the scalar product of two vectors, as for a correlation, the range is bounded by the maximum value of each element in the vectors, and the length (number of element or dimension) of the vectors. If we represent the vectors by L, and these are populated with values from m $\in\{0, 1\}$ (for a one-bit quantisation as discussed above, which can be used in GNSS services), this implies that the exponent is bound within the range $\{0, L\}$. The spreading codes typically used in GNSS services have a length of the order of thousands or sometimes tens of thousands of chips (bits), in which case L would be of the same order, assuming the length or duration of the correlation is the same length as that of the code (which is often, although not necessarily, the case). In this case it is feasible, for example, to provide the receiver with a lookup table which contains all possible values of L for decryption.

However, the above approach is not limited to binary input messages, and the multiplication of any discrete input values can be performed by first applying a linear transformation to the input values, such that they lie on the appropriate range (i.e. non-negative integers), thereby allowing the scalar product to be performed in ElGamal. Subsequently an equivalent inverse transformation is then applied to the scalar product to retrieve the result. For example, in the case of GNSS services, in which the received signal is quantised to 1-bit, represented as ±1 (i.e. $\{-1, 1\}$, then a simple pre-scaling of $x \rightarrow (x+1)/2$, such that the sample values are transformed to $\{0, 1\}$ for multiplication. Subsequently, the resultant scalar product can be scaled by $x \rightarrow 2x-L$ to return the result to the appropriate interval $\{-L, +L\}$.

Remote Processing Architecture

As described above, in the context of GNSS remote processing, both the receiver and the remote server have privacy interests: the receiver does not wish to disclose its position, while the remote server does not wish to disclose the secret spreading codes used for determining a position. The remote-processing scheme described herein addresses both of these issues. The data delivered by the user to the remote server is pre-processed in such a way that the server cannot glean information about the user position (location).

Note also that in Equation (2) above, the local replica signal ($c_{(i)}(t)$) is aligned to the integration limits, rather than the received signal (which is offset by $\tau_{(i)}$). This ensures that the integration is performed across a specific region of the spreading code, namely from $c_{(i)}(t_0)$ to $c_{(i)}(t_0+T_i)$, and so avoids using information relating to the position of the receiver (or the propagation delay between the satellite and the receiver, $\tau$) when generating the local replica code ($c_i(t)$). Furthermore, as described above, the samples of the received signal (r) are encrypted prior to sending these samples to the remote server for processing; this ensures that the server cannot use such samples to determine the receiver position.

One relatively straightforward processing scheme would be for the receiver to send the server its received signal in encrypted form, and the server to compute correlation values for the full search space, spanning a suitably wide range of Doppler and code delay, for all satellites in the constellation. Note that the receiver may have, or be provided with, some prior knowledge that could narrow this search space, such as currently visible satellites, maximum code delay, etc., but providing this information to the server would in effect leak information to the server regarding the receiver's position. Whether the receiver shares any of this prior knowledge with the server may in part depend on the nature and extent of the receiver's privacy concerns; for example, whether the receiver wants to prevent the server having any indication of the receiver's position, or is more concerned with preventing the server from having more precise information about the receiver's position. Once the search spaces have been computed (in their encrypted form) by the server, they can be returned to the receiver for decryption. By detecting the correlation peaks in the search space, the receiver is then able to determine its position in a conventional fashion.

The above approach might be utilized during the acquisition phase. During a subsequent tracking phase, the receiver is already aware of the relevant (current) Doppler and code delay offsets for a given satellite signals it is receiving. Accordingly, the receiver may adjust its received signal by these offsets, in effect transforming the received signal to a normalized signal of zero frequency (Doppler) offset and zero time offset. This transformed (normalized) signal can then be transmitted in encoded form to the server for performing a correlation against the spreading codes of the GNSS satellites. The server then returns the correlations for each satellite in respect of the received normalized line signal.

Note that the code delay and Doppler offset are satellite-dependent, hence the receiver may determine and send to the server a different normalized signal in respect of each satellite. In addition, the server may potentially calculate multiple correlations for a received signal in respect of each satellite, for example, according to the Early Late and Prompt scheme discussed above and in EP 3104195. When the encrypted correlations are returned to the receiver and decrypted, the relative strengths of the Early, Late and Prompt correlations allows the receiver to adjust (track) the measured offset (delay) between the satellite and the receiver.

Such a scheme might be implemented as follows:

1) the receiver generates a key pair: $K_{priv}$ and $K_{pub}$ (private and public respectively)
2) the receiver collects samples from the signal-in-space, r
3) given the code-delay, Doppler frequency and carrier phase, the receiver forms an equivalent baseband (normalized) time-series, $r_{\tau_i,\omega_i,\theta_i}$ corresponding to the signal-in-space, r
4) the receiver encrypts this vector with its public key to form $\bar{r}_i = \varepsilon[r_{\tau_i,\omega_i,\theta_i}, K_{pub}]$
5) the receiver sends $\bar{r}_{(i)}$ and $K_{put}$ to the server
6) the server computes $\bar{c}_{(i)} = \varepsilon[c_{(i)}, K_{pub}]$ for i $\in$ SV
7) the server computes $\bar{R}_{(i)} = \varepsilon[R_{(i)}, K_{pub}]$ for some random noise $R_{(i)}$ (see below)
8) the server computes $\bar{Y}_{(i)} = \bar{c}_{(i)} \cdot \bar{r}_{(i)} + \bar{R}_{(i)}$ and returns to the receiver
9) the receiver computes $Y_{(i)} = \mathcal{D}[\bar{Y}_{(i)}, K_{priv}]$, i.e. the received correlation values are decrypted using the private key of the receiver.
10) from the analysis of $Y_{(i)}$, the receiver is able to compute and/or verify its position.

Apart from the general scheme of using remote processing by a server to perform correlation of an encrypted signal from a receiver, thereby maintaining security for both the receiver's position and the spreading code associated with the signal, the above processing incorporates an additional level of security for the spreading code. Thus one form of attack on the approach described herein is for an adversary to send a succession of signals $\bar{r}_{(i)}$ to be correlated, where, for example, in the nth signal, the nth value of $\bar{r}_{(i)}$ is 1, and the remaining values of $\bar{r}_{(i)}$ are all zero. In this way, the correlations in effect sample each bit of the relevant spreading code in turn, and hence eventually provide adversary access to the bit (chip) sequence of the spreading code.

There are various defenses that the server can deploy to protect against such an attack, and these defenses may be employed individually or in combination according to the particular circumstances. For example, one option is to monitor the incoming values of $\bar{r}_{(i)}$ to see if they represent a particular pattern that might be used in such an attack (if and so decline to provide further correlations). Another possibility is that military spreading codes a frequency updated (e.g. on a timescale of a few seconds or less). The server may therefore throttle or otherwise constrain the rate of correlations performed for any receiver, such that the number of correlations performed for any given receiver is significantly less than the number of bits in the relevant spreading codes.

A further option, as implemented above, is to distort or obfuscate the correlation values by the addition of a small amount of random noise (as per operations 7 and 8 above). This will prevent or at least hinder such an attack from being able to access the bit sequence of the relevant code. (There may also be a slight loss in positioning accuracy, due to the additional noise, however, this should be relatively minor if the added noise is relatively low level). This obfuscation is described further below.

Preserving Spreading Code Secrecy

As described above, each satellite broadcasts a unique pseudo-random binary sequence denoted here by $q_{(i)}$. For the sake of clarity, we will consider now the binary sequence from one satellite only, and so drop the subscript (i), and denote the sequence by $q=[q_0; q_1; \ldots]$, where the elements of $q \in \{-1, +1\}$ represent the spreading sequence chips (bits) that are modulated onto the broadcast signal during successive chip periods, where the length of a chip period is $T_c$.

The signal received from a given satellite can be modeled as an equivalent discrete-time baseband waveform, sampled at some constant rate $F_s$, and denoted here by $s=[s_0; s_1; \ldots; s_L]$, where $s \in \{-\sqrt{C}, +\sqrt{C}\}$, and where C is the received carrier power (e.g. in Watts). The modulation is performed such that one or more successive elements of s convey the value of each element of q. For simplicity it is assumed here that the product $k=F_s T_c$ is an integer, such that each element of q is modulated onto exactly k successive elements of s.

This received signal is corrupted by an additive white Gaussian noise given by $n=[n_0; n_1; \ldots; n_L]$ with independent and identically distributed terms:

$$n_i \sim N\left(0, \sqrt{\frac{F_s N_0}{2}}\right).$$

The receiver applies quantization (e.g. 1-bit) to the received signals to produce a binary sequence $r=[r_0; r_1; \ldots; r_L]$, where:

$$r_i = \begin{cases} -1 & \text{for } s_i + n_i < 0 \\ +1 & \text{otherwise} \end{cases} \quad \text{(Equation 21)}$$

The receiver then dispatches r, in encrypted form, to the server, where the correlations with a set of local replica signals are computed. The server produces a local replica of the satellite signal which yields a binary vector, where $c=[c_0; c_1; \ldots; c_L]$, where:

$$c_i = \begin{cases} -1 & \text{for } s_i < 0 \\ +1 & \text{otherwise} \end{cases} \quad \text{(Equation 22)}$$

and then computes the normalized scalar (dot) product $Y=r \cdot c/L$. In the case that the received signal is present then Y follows a binomial distribution with mean: (Equation 23)

$$\langle Y \rangle = 2p-1$$

and variance where $$\langle Y^2 \rangle - \langle Y \rangle^2 = \frac{4p(1-p)}{L} \quad \text{(Equation 24)}$$

$$p = 1 - \frac{1}{2}\text{erfc}\left(\sqrt{\frac{C}{N_0 F_s}}\right) \quad \text{(Equation 25)}$$

The signal-to-noise ratio of Y, denoted here is given by:

$$\Gamma_Y = \left(\frac{L(p-0.5)^2}{p(1-p)}\right) \quad \text{(Equation 26)}$$

Because the server is not capable of observing the received signal vector, r, per se, as described above, a malicious receiver might potentially dispatch an 'interrogation' vector, denoted here by $c=[v_0; v_1; \ldots; v_L]$, with the intention of learning the values of the secret spreading sequence, q. For example, if v is constructed as:

$$v_i = \begin{cases} 1 & \text{for } (j-1)k \leq i \ll jk \\ 0 & \text{otherwise} \end{cases} \quad \text{(Equation 27)}$$

then the scalar product would reveal $q_i$ since:

$$c \cdot v = \frac{k}{L} q_j \quad \text{(Equation 28)}$$

Repeated interrogation of the server in this manner will ultimately reveal the entire vector q. Even if the server limits the number of requests made by any given user, multiple users might collude, each retrieving different elements of the vector q. This might then be difficult to police or event, since a practical system might need to serve a very large number of users.

Accordingly, in order to provide additional protection for q, some form of obfuscation may be utilized, as mentioned above. For example, to prevent the scalar product being used to derive q, the server might corrupt the value of Y with an additive noise, W, to produce an obfuscated dot product, Y' as $Y'=Y+W$, with $W \sim N(0, \sigma_w)$. In this case, when the server is interrogated with v the result is:

$$Y' = \frac{c \cdot v}{L} = \frac{k}{L} q_j + W \quad \text{(Equation 29)}$$

which does not directly reveal $q_j$. Depending on the value of $\sigma_w$, the adversary would have to perform multiple interrogations of the server to extract a reliable estimate of $q_j$. If the adversary were to make M interrogations using a particular vector v, then the estimate of $q_j$ can be improved by forming the linear combination of the result of each interrogation. This will yield a decision variable, $\Sigma Y'$ with mean:

$$(\Sigma Y') = \begin{cases} +\dfrac{Mk}{L} & \text{for } q_j = 1 \\ -\dfrac{Mk}{L} & \text{for } q_j = 0 \end{cases} \quad \text{(Equation 30)}$$

and variance $M\sigma_w^2$. The adversary might then estimate $q_j$ by examining the sign of $\Sigma Y'$. The effective signal-to-noise ratio of this decision variable, once this noise has been added, is given by:

$$\Gamma_{\Sigma Y'} = \frac{Mk^2}{L^2 \sigma_w^2} \quad \text{(Equation 31)}$$

Directly observing q in the broadcast signal-in-space will yield a signal-to-noise ratio of $$T_c \frac{C_{max}}{N_0}.$$

It may be reasonable to choose $\sigma_w$ such that performing M interrogations yields only the same information:

$$\frac{Mk^2}{L^2 \sigma_w^2} = T_c \frac{C_{max}}{N_0} \quad \text{(Equation 32)}$$

Therefore, if M interrogations of the system are to reveal only the same information about $q_j$ as is available through a single observation of the signal-in-space, the variance of W must be:

$$\sigma_w^2 = \frac{Mk^2}{L^2 \left(T_c \dfrac{C_{max}}{N_0}\right)} \quad \text{(Equation 33)}$$

The cost of this protection of $q_j$ is that the variance of Y' is increased relative to the variance of D and so the quality of service provided to genuine users of the service is degraded. The signal-to-noise ratio of Y' can be calculated as follows:

$$\Gamma_{Y'} = \frac{(2p-1)^2}{\dfrac{4p(1-p)}{L} + \sigma_w^2} \quad \text{(Equation 34)}$$

And the loss in signal-to-noise ratio can be found from Equations (26) and (34) as:

$$Loss_\Gamma = \frac{\dfrac{4p(1-p)}{L} + \sigma_w^2}{\dfrac{4p(1-p)}{L}} \quad \text{(Equation 35)}$$

$$= 1 + \frac{L\sigma_w^2}{4p(1-p)}$$

Substituting Equation (33) into Equation (35) and simplifying yields:

$$Loss_\Gamma = 1 + \frac{Mk^2}{4 \dfrac{C_{max}}{N_0} LT_c(p-p^2)} \quad \text{(Equation 36)}$$

With reference to Equation (27), we can approximate p, for small $$\frac{C}{N_0 f_s},$$

as:

$$p \approx \sqrt{\frac{C}{N_0 \pi F_s}} \quad \text{(Equation 37)}$$

Substituting Equation (37) into Equation (36) we arrive at:

$$Loss_\Gamma = 1 + \frac{Mk^2}{L \dfrac{C_{max}}{N_0} T_c \left(1 - \dfrac{4C}{\pi N_0 F_s}\right)} \quad \text{(Equation 38)}$$

Further noting that $$\left(1 - \frac{4C}{\pi N_0 F_s}\right) \approx 1,$$

we can simplify Equation (38) to yield:

$$Loss_\Gamma = 1 + \frac{Mk^2}{L \dfrac{C_{max}}{N_0} T_c} \quad \text{(Equation 39)}$$

Finally, recognizing that $k = T_c F_s$, and $L = T_I F_s$, we arrive at:

$$Loss_\Gamma = 1 + \frac{MT_c F_s}{\dfrac{C_{max}}{N_0} T_I} \quad \text{(Equation 40)}$$

Equation (40) provides some insight into the expected loss. For example, the product $T_c F_s$ is equivalent to the ratio of the sampling rate and the chip rate and, for typical receiver frequency plans, is in the range 5-10—e.g. a signal with a 1 MHz chipping rate is sampled at 10 MHz). An adversary who intends to observe the values of q directly might achieve upwards of $$\frac{C_{max}}{N_0} = 55 \text{ dBHz}$$

using a high quality antenna, or upwards of $$\frac{C_{max}}{N_0} = 60 \text{ dBHz}$$

using slightly directional antennas. Finally, considering the data-set length for snapshot positioning, it is possible the receiver might capture some tens or hundreds of milliseconds of data, yielding $0.02 \leq T_j \leq 0.5$ seconds.

In summary, this result indicates a server can perform correlation operations for up to M clients using the following noise-adding correlation equation: (Equation 41)

$$Y' = r \cdot c + W$$

where $W \sim N(0, \sigma_w)$, and, by simplifying Equation (33):

$$\sigma_w^2 = \frac{MT_c}{\frac{C_{max}}{N_0} T_j^2} \quad \text{(Equation 42)}$$

Accordingly, the client will experience a post-correlation SNR loss given by Equation (40) relative to traditional correlation. Under this configuration, the server will reveal no more information about any single chip of c than could be learned by observation of the live signal in space at a carrier-to-noise-floor ratio of $$\frac{C_{max}}{N_0}.$$

Configurations

The above description has generally assumed a two-party interaction involving a receiver and a server. In such a configuration, the receiver not only receives the GNSS signals, which are then encrypted and forwarded to the server, but also receives back the (encrypted) correlation values for use in position determination. However, in other configurations, the server may supply the encrypted correlation values to another party (instead of or in addition to the receiver). Such a configuration might be adopted because the receiver is incapable, or uninterested, in determining the correlation values itself.

For example, the receivers might be attached to shipping containers or the like. Such a receiver would encrypt and then forward the incoming signal to the server for processing. The server might return the encrypted correlation values to a freight management company which is responsible of the container, and has the private key ($K_{priv}$) for decrypting the encrypted correlation values in order to be able to track the location of the container. A similar configuration might be used in an electronic tagging scheme, in which an electronic tag acts as a receiver that transmits encrypted signal values to the server, and the resulting encrypted correlations values determined by the server are then transmitted from the server to an authority responsible for monitoring the subject of the electronic tagging. Many other configurations and possible applications will be apparent to the skilled person.

More generally the approach described herein may be implemented into some form of receiver (for use in conjunction with a remote server). The receiver may be provided as a standalone receiver or incorporated into some other type of device—e.g., a mobile telephone, a cellular radio access node (e.g., a 5G small cell), a tablet, a vehicle GPS (car, plane, ship, bicycle, etc.), camera, or any other appropriate location monitoring/tracking system. The receiver may implement such a method at least in part by executing program instructions on one or more processors (such as DSPs, GPUs, etc), and/or the receiver may implement such a method at least in part by utilizing special purpose hardware—e.g., one or more chips specially designed to support the method, e.g., by providing multiple hardware correlators, etc. A computer program may also be provided for implementing the approach described herein. Such a computer program typically comprises computer program instructions which may be provided on a non-transitory computer readable storage medium, such as an optical disk (CD or DVD), hard disk, or flash memory. The computer program may be loaded into a computer memory from such a storage medium, or may be downloaded into the computer memory over a network, such as the Internet. The apparatus, e.g., receiver, loading the computer program may comprise one or more processors for executing the computer program, which comprises instructions that cause the apparatus to implement a method such as described above.

In conclusion, a variety of implementations have been described herein, but these are provided by way of example only, and many variations and modifications on such implementations will be apparent to the skilled person and fall within the scope of the present embodiments, which are defined by the appended claims and their equivalents.

The invention claimed is:

1. A method for processing a global navigation satellite system (GNSS) signal, the GNSS comprising multiple satellites, wherein each satellite transmits a respective navigation signal containing a spreading code, the method comprising:
   receiving an incoming signal at a receiver, wherein the incoming signal contains navigation signals from a satellite;
   determining Doppler and code delay offsets for the satellite based on the incoming signal;
   generating a public-private key pair comprising a public key to encrypt data and a private key to decrypt the data encrypted by the public key, using an asymmetric homomorphic encryption scheme;
   generating a normalized signal based on the incoming signal and the Doppler and code delay offsets;
   encrypting the normalized signal using the public key to form an encrypted signal;
   transmitting the encrypted signal and the public key to a remote server;
   receiving, from the remote server, one or more encrypted correlation values, each encrypted correlation value representing a dot product between the encrypted signal and a spreading code of the GNSS, wherein the spreading code is encrypted using the public key prior to performing the correlation;
   decrypting the one or more encrypted correlation values using the private key; and
   using the decrypted correlation values to determine the location of the receiver.

2. The method of claim 1, wherein receiving the incoming signal comprises recording a set of samples of the incoming signal representing a given duration of time, and wherein encrypting the incoming signal comprises encrypting the set of samples to form the encrypted signal.

3. The method of claim 1, wherein the homomorphic encryption scheme is partly homomorphic.

4. The method of claim 3, wherein the homomorphic encryption scheme is multiplicatively homomorphic, and wherein the incoming signal is exponentiated prior to encryption.

5. The method of claim 3, wherein the homomorphic encryption scheme is ElGamal.

6. The method of claim 1, wherein the spreading code is securely maintained at the remote server and is not disclosed to the receiver.

7. A method for processing a global navigation satellite system (GNSS) signal at a server, the GNSS comprising multiple satellites, wherein each satellite transmits a respective navigation signal containing a spreading code, the method comprising:
  at the server, receiving, from a receiver, an encrypted signal formed by encrypting a normalized GNSS signal using a public key created using an asymmetric homomorphic encryption scheme and the public key, the normalized signal generated based on Doppler and code delay offsets for a satellite;
  encrypting a spreading code for the normalized GNSS using the public key to generate an encrypted spreading code;
  performing correlations between the received encrypted signal and the encrypted spreading code to produce encrypted correlation values representing a dot product between the encrypted signal and the encrypted spreading code; and
  transmitting the encrypted correlation values to the receiver.

8. The method of claim 7, wherein the encrypted signal is quantised to one-bit such that the correlations can be performed just by addition.

9. The method of claim 7, further comprising adding random noise to the encrypted correlation values to obfuscate the spreading code used to form the encrypted correlation values.

10. An apparatus configured to process a global navigation satellite system (GLASS) signal, the GNSS comprising multiple satellites, Wherein each satellite is configured to transmit a respective navigation signal containing a spreading code, the apparatus comprising:
  memory; and
  a processor coupled to the memory, the processor being configured to:
    receive an incoming signal at a receiver, wherein the incoming signal contains navigation signals from a satellite;
    determine Doppler and code delay offsets for the satellite based on the incoming signal;
    generate a public-private key pair comprising a public key to encrypt data and a private key to decrypt the data encrypted by the public key, using an asymmetric homomorphic encryption scheme;
    generate a normalized signal based on the incoming signal and the Doppler and code delay offsets;
    encrypt the normalized signal using the public key to form an encrypted signal;
    transmit the encrypted signal and the public key to a remote server;
    receive, from the remote server, one or more encrypted correlation values, each encrypted correlation value representing a dot product between the encrypted signal and a spreading code of the GNSS, wherein the spreading code is encrypted using the public key prior to performing the correlation;
    decrypt the one or more encrypted correlation values using the private key; and
    use the decrypted correlation values to determine the location of the receiver.

* * * * *